United States Patent
Nakamura et al.

(10) Patent No.: US 7,370,147 B2
(45) Date of Patent: May 6, 2008

(54) DISK ARRAY DEVICE AND CONTROL METHOD THEREFOR

(75) Inventors: Toshikatsu Nakamura, Odawara (JP); Kenji Oonabe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 244 days.

(21) Appl. No.: 11/159,654

(22) Filed: Jun. 22, 2005

(65) Prior Publication Data

US 2006/0236030 A1     Oct. 19, 2006

(30) Foreign Application Priority Data

Apr. 13, 2005   (JP)  .............................. 2005-116289

(51) Int. Cl.
*G06F 12/00*   (2006.01)
*G06F 13/00*   (2006.01)
*G06F 13/12*   (2006.01)

(52) U.S. Cl. ....................... 711/114; 711/111; 711/112; 714/9

(58) Field of Classification Search ................. 711/114
See application file for complete search history.

(56) References Cited

U.S. PATENT DOCUMENTS

| | | | |
|---|---|---|---|
| 5,812,754 A * | 9/1998 | Lui et al. ........................ | 714/6 |
| 5,922,077 A | 7/1999 | Espy et al. | |
| 6,098,155 A | 8/2000 | Chong | |
| 6,343,324 B1 * | 1/2002 | Hubis et al. ................. | 709/229 |
| 6,349,357 B1 | 2/2002 | Chong | |
| 6,363,462 B1 * | 3/2002 | Bergsten ..................... | 711/162 |
| 6,385,681 B1 | 5/2002 | Fujimoto et al. | |
| 6,772,270 B1 * | 8/2004 | Kurpanek .................... | 710/316 |
| 7,146,522 B1 * | 12/2006 | Rowe et al. ................... | 714/6 |
| 2003/0212860 A1 | 11/2003 | Jiang et al. | |
| 2003/0231420 A1 * | 12/2003 | Kano et al. .................. | 360/69 |
| 2006/0168371 A1 * | 7/2006 | Chiu ........................... | 710/62 |

FOREIGN PATENT DOCUMENTS

EP          0751464 A1    1/1997
WO       WO99/63442 A1   12/1999

OTHER PUBLICATIONS

QLogic, Fibre Channel Controller ISP2322 datasheet, 2003.*
European patent Office (EPO) Extended European Search report dated Sep. 4, 2007 for EPO patent application EP07012449.

* cited by examiner

*Primary Examiner*—Pierre Bataille
*Assistant Examiner*—Ralph A Verderamo, III
(74) *Attorney, Agent, or Firm*—Townsend and Townsend and Crew LLP

(57) ABSTRACT

A disk array device having a dual controller for executing data input/output processing for disk drives in response to a data input/output request from a host computer. Each controller constituting the dual controller has an FC controller which is interface-connected to the host computer via one path of a front interface connection FC and to the disk drives via one path of a back interface connection FC, and a PBC for switching the connection destination of the back interface connection FC between the two FC-ALs loop-connected to the disk drives.

19 Claims, 13 Drawing Sheets

DISK ARRAY DEVICE AND CONTROL METHOD THEREFOR

CROSS-REFERENCE TO RELATED APPLICATION

This application relates to and claims priority from Japanese Patent Application No. 2005-116289, filed on Apr. 13, 2005, the entire disclosure of which is incorporated herein by reference.

BACKGROUND OF THE INVENTION

The present invention relates to a disk array device and a control method therefor.

With the recent progress in IT technology, demand for high-performance and low-cost disk array devices with large volumes has increased. A disk array device has a number of disk drives arranged in arrays and configured based on a Redundant Array of Independent Inexpensive Disks (RAID) system. A host computer issues a write access command or a read access command to this disk array device to read or write data from/to the disk drives. Such a disk array device provides a redundant structure with regard to its internal devices—for example, it adopts a dual controller (duplex controller) structure aiming to enhance failure tolerance and achieve high performance (as in Japanese Patent Laid-Open Publication No. 2003-256150). A disk array device sometimes adopts Fibre Channel interfaces for both an interface to the host computer (hereinafter called a "front interface") and an interface to the disk drives (hereinafter called a "back interface") in order to achieve high-speed data transfer. In the above disk array device having the dual controller structure, one controller has one Fibre Channel Protocol controller for front-interface connection and one Fibre Channel Protocol controller for back-interface connection.

SUMMARY OF THE INVENTION

This structure, however, is expensive to manufacture because each controller has two expensive Fibre Channel Protocol controllers. Accordingly, to achieve further distribution of disk array devices, it is necessary to lower the manufacturing cost. Thereupon, a structure can be conceived where the number of Fibre Channel Protocol controllers for a controller is decreased to one so that one Fibre Channel Protocol controller is used for both the front-interface connection and the back-interface connection. However, when there is only one Fibre Channel for the back-interface connection, a disk array device requiring high reliability will have a problem in terms of failure tolerance.

On the other hand, a disk array device having a dual controller structure is structured in a manner that when a failure that requires lock-out occurs in one of the two controllers, the faulty controller executes lock-out processing to lock itself out so that an I/O from the host computer is failovered to the other controller. Conventional lock-out processing includes processing to save various register information (failure information) or the like in cache memory, processing to disable optical output function by a Gigabit Interface Converter (GBIC) module installed at the host interface of the Fibre Channel Protocol controller in the faulty controller, and processing to initialize the Fibre Channel Protocol controller in the faulty controller. As a result of this lock-out processing, response signals are no longer returned from the disk array device to the host computer, therefore, the host computer judges that a failure has occurred in the disk array device and conducts path switching. Moreover, as a result of the lock-out processing, a storage administrator can analyze the cause of the failure based on the failure information saved in the cache memory.

The reasons for disabling the optical output function of the GBIC module and initializing the Fibre Channel Protocol controller during the locking-out processing are as follows. The Fibre channel Protocol controller conducts data communication based on Fibre Channel Protocol by transmitting optical signals between itself and the host computer. During this data communication, events occur constantly and interruption processing requests are continuously input from the Fibre Channel Protocol controller to the CPU. An interruption processing request is set higher in priority than a request for controller locking-out task processing. Therefore, even when a failure occurs in a controller, if a Fibre Channel Protocol controller therein is executing data communication with the host computer, interruption processing requests are constantly input from the Fibre Channel Protocol controller to the CPU, thereby preventing, for a long time, the CPU from executing the controller locking-out task processing. So, by disabling the optical output function of the GBIC module—data communication based on Fibre Channel Protocol between the disk array device and the host computer via a Storage Area Network (SAN)—and resetting the Fibre Channel Protocol controller, data communication between the host computer and the Fibre Channel Protocol controller will no longer be conducted. Consequently, events occurring due to data communication between the host computer and the Fibre Channel Protocol controller are inhibited, interruption processing requests are no longer made from the Fibre Channel Protocol controller to the CPU, and the CPU can execute the controller locking-out task processing.

However, in the case of a Fibre Channel Protocol controller including, in a single LSI, a core (hereinafter called a "front-side core") for controlling Fibre Channel Protocol used between the host computer and a controller, and a core (hereinafter called a "back-side core") for controlling Fibre Channel Protocol between the controller and the disk drives, because both cores are connected to each other by a PCI-X bus, it is impossible to initialize only one of them. Therefore, when conducting the above lock-out processing, both cores are initialized at the same time. A module controlling the front-side core is conventionally designed to cope with sudden initialization, but a module controlling the back-side core is not. It will require enormous labor to improve the module for controlling the back-side core so that it can cope with the sudden initialization. For these reasons, an alternative technique should be found for a Fibre Channel Protocol controller having both cores in a single LSI, so that the lock-out processing can be executed stably.

The present invention was made considering the above problems. One of the objects of the present invention is to provide a low-cost disk array device having an enhanced failure tolerance for a back interface.

Another object of the present invention is to provide a method for controlling a disk array device having a Fibre Channel Protocol controller which includes a front-side core and a back-side core in a single LSI, by which controller locking-out processing can be executed stably when a failure occurs in the controller.

Yet another object of the present invention is to provide a method for controlling a disk array device, by which, a failure in the controller can be detected by a host computer or path switching software and an I/O pass from the host computer is failovered.

In order to achieve the above objects, the present invention provides a disk array device having a dual controller for executing data input/output processing for disk drives in response to a data input/output request from a host computer, each controller constituting the dual controller having a Fibre Channel Protocol controller interface-connected to the host computer via one path of a front interface connection Fibre Channel, and to the disk drives via one path of a back interface connection Fibre Channel, two FC-ALs loop-connected to the disk drives, and a connection switching circuit for switching a connection destination of the back interface connection Fibre Channel between the two FC-ALs.

For example, when a loop failure occurs in one of the two FC-ALs therein, the connection switching circuit switches the connection destination of the back interface connection Fibre Channel to the other FC-AL, in which no loop failure has occurred.

The present invention also provides a method for controlling a disk array device having a dual controller structure, each controller constituting the dual controller having a CPU for executing data input/output processing for disk drives in response to a data input/output request from a host computer, a cache memory for temporarily storing data transmitted between the host computer and the disk drives, a Fibre Channel Protocol controller having, in a single LSI circuit, a core interface-connected to the host computer via one path of a front interface connection Fibre Channel for controlling a Fibre Channel Protocol used between itself and the host computer, and a core interface-connected to the disk drives via one path of a back interface connection Fibre Channel for controlling a Fibre Channel Protocol used between itself and the disk drives, a GBIC module transmitting an optical signal with the host computer via the front interface connection Fibre Channel, two FC-ALs loop-connected to the disk drives, and a connection switching circuit for switching a connection destination of the back interface connection Fibre Channel between the two FC-Als, wherein the CPU execute the steps of disabling interruption to the CPU from the Fibre Channel Protocol controller, shutting off negotiations with the host computer being conducted prior to commencement of data communication based on Fibre Channel Protocol, inhibiting optical signal output from the GBIC module, and saving failure information to the cache memory.

When one of the controllers is to be locked out by the method, or if one of the controllers cannot be locked out by the method, the other controller inhibits optical signal output from the GBIC module in the controller to be locked out.

According to the present invention, it is possible to provide a low-cost disk array device having an enhanced failure tolerance for a back interface. Moreover, controller locking-out processing can be executed stably when a failure occurs in a controller and I/O pass failover can be executed properly by the host computer.

DETAILED DESCRIPTION OF THE INVENTION

Embodiments of the present invention will be explained hereinafter with reference to the drawings. None of the embodiments will limit the scope of claim for the patent and all the combinations of characteristics explained in the embodiments are not necessarily essential to a solution method of the present invention.

EMBODIMENT 1

Figure 1:
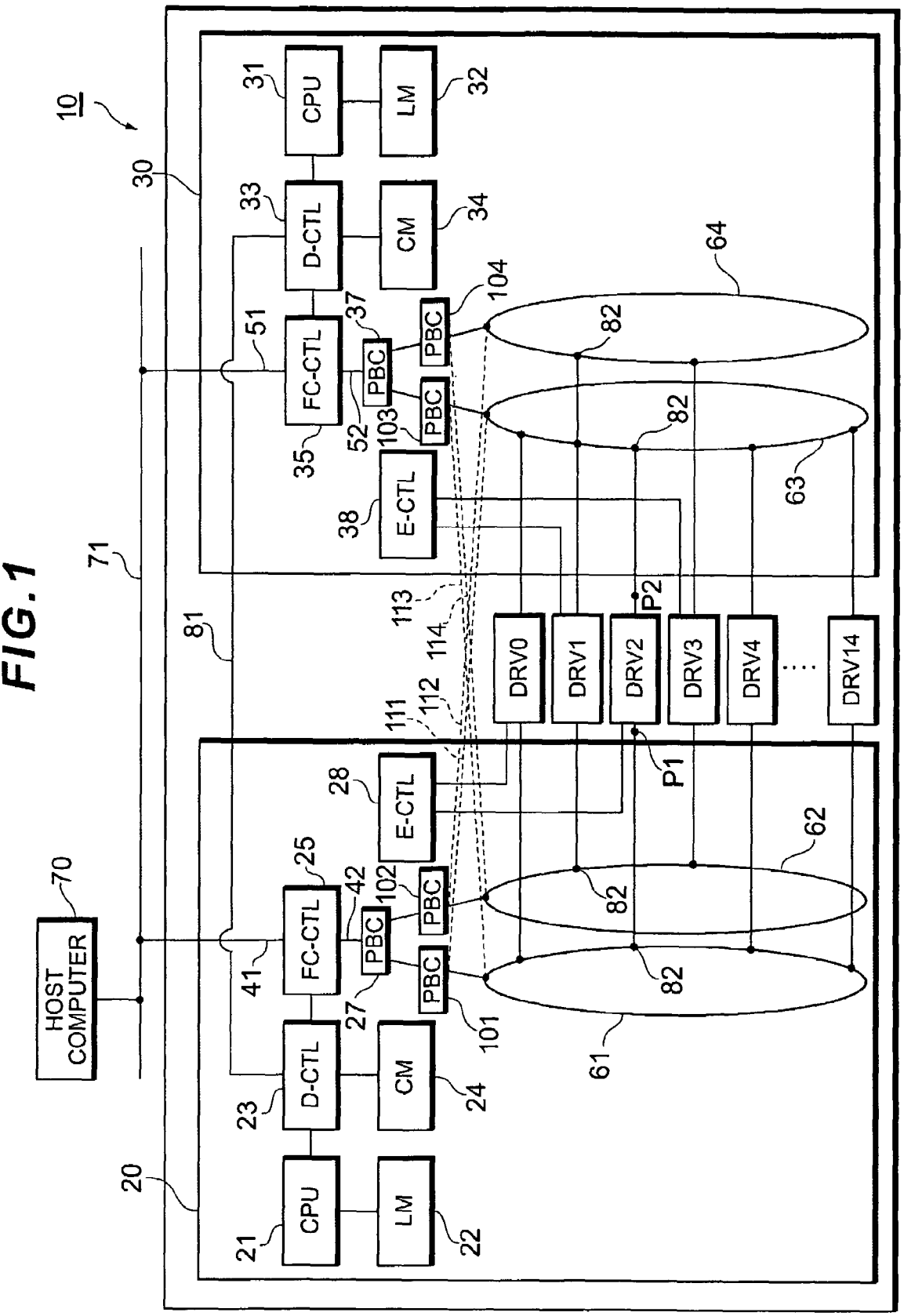
FIG. 1 shows a structure of a disk array device according to Embodiment 1.

FIG. 1 shows a structure of a disk array device 10 according to Embodiment 1. The disk array device 10 is connected to a host computer 70 via a communication network 71. The host computer 70 is, for example, a server, a personal computer, a workstation, or a mainframe that functions as a host computer for the disk array device 10. Examples of the communication network 71 include a Local Area Network (LAN), a Storage Area Network (SAN), the Internet, and a dedicated line. In the case of a open-type host, data transfer is conducted based on protocols such as Transmission Control Protocol/Internet Protocol (TCP/IP), Fibre Channel Protocol (FCP), and internet Small Computer System Interface (iSCSI). In the case of a mainframe-type host, it is conducted based on communication protocols such as Fibre Connection (FICON, registered trademark), Enterprise System Connection (ESCON, registered trademark), Advanced Connection Architecture (ACONARC, registered trademark), and Fibre Connection Architecture (FIBARC, registered trademark).

Incidentally the disk array device 10 may have a Network Attached Storage (NAS) function which is configured in such a manner that filename-specific data output requests are received from the host device 70 based on protocols such as a Network File System.

The disk array device 10 adopts a dual controller configuration which employs a controller 20 and a controller 30. The controller 20 is equipped with a CPU 21, a local memory (LM) 22, a data controller (D-CTL) 23, a cache memory (CM) 24, a Fibre Channel Protocol controller (F-CTL) 25, a Port Bypass Circuit (PBC) 27, an enclosure controller (E-CTL) 28, and Fibre Channel Arbitrated Loops (FC-ALs) 61 and 62.

The CPU 21 is a processor for controlling data input/output processing (write access or read access) for a plurality of disk drives DRV0 to DRV 14 in response to data input/output requests from the host computer 70 and executes a micro program stored in the local memory 22 to control the data controller 23, Fibre Channel Protocol controller 25, and the PBC 27. Controlled by the CPU 21, the data controller 23 controls data transfer between the Fibre Channel Protocol controller 25 and the cache memory 24. The cache memory 24 temporarily stores data transmitted between a front interface and the host computer or between a back interface and the disk drives via the Fibre Channel Protocol controller 25.

The Fibre Channel Protocol controller 25 is interface-connected to the host computer 70 via a front interface connection Fibre Channel 41 and equipped with the ability to receive block access requests based on Fibre Channel Protocol. It is also interface-connected to the disk drives DRV 0 to DRV 14 via a back interface connection Fibre Channel 42 and equipped with the ability to transmit data input/output requests to/from the disk drives DRV 0 to DRV 14 based on protocol regulating commands or the like controlling the disk drives DRV 0 to DRV 14. The PBC 27 selects either or both the two FC-ALs 61 and 62 as the back interface connection Fibre Channel 42 connection destination(s) and conducts connection switching.

The FC-AL 61 is loop-connected to the even-numbered disk drives DRV 0, DRV 2, . . . DRV 14 via PBCs 82 provided on the FC-AL 61. The FC-AL 62 is loop-connected to the odd-numbered disk drives DRV 1, DRV 3, . . . DRV13 via PBCs 82 provided on the FC-AL 62. A PBC 82 is an electronic switch for automatically opening or closing the FC-ALs 61 or 62 so that a node can be added or deleted while keeping failures in system operation to a minimum. It has the function of bypassing the Fibre Channel Protocol controller 25 and the disk drives DRV 0 to DRV 14 and electrically removing them from the FC-AL 61 or 62. For example, a PBC 82 separates faulty disk drives in the disk drives DRV 0 to DRV 14 from the FC-AL 61 or 62 and enables communication between the remaining disk drives and the Fibre Channel Protocol controller 25. It also enables insertion and removal of the disk drives DRV 0 to DRV 14 while maintaining the operations of the FC-AL 61 or 62. For example, when a new disk drive DRV 15 (not shown in the figure) is inserted, a PBC 82 incorporates the disk drive DRV 15 into the FC-AL 62 and enables communication with the Fibre Channel Protocol controller 25.

The enclosure controller (E-CTL) 28 controls SCSI Enclosure Circuit (SES) drive(s). An SES drive has the SES (SCSI Enclosure Services) function and the ESI (Enclosure Service I/F) function regulated by Small Computer System Interface 3 (SCSI3) to perform. In Embodiment 1, the SES drive(s) are disk drives able to communicate with the enclosure controller 28, in addition to the FC-ALs 61 to 64. In this embodiment, each FC-AL has two disk drives (DRV0 and DRV 2, and DRV 1 and DRV 3) as SES drives, however, all the disk drives DRV 0 to DRV 14 may be set as SES drives Incidentally, the front interface connection Fibre Channel 41 and the back interface connection Fibre Channel 42 on the controller 20 are respectively single paths.

The controller 30 is structured in the same manner as the controller 20 and is equipped with a CPU 31, a local memory (LM) 32, a data controller (D-CTL) 33, a cache memory (CM) 34, a Fibre Channel Protocol controller (FC-CTL) 35, a PBC 37, an enclosure controller (E-CTL) 38, a front interface connection Fibre Channel 51, a back interface connection Fibre Channel 52, and FC-ALs 63 and 64. The PBC 37 selects, as a connection destination of the back interface connection Fibre Channel 52, either or both the FC-ALs 63 and 64 and conducts connection switching. The FC-AL 63 is loop-connected to the even-numbered disk drives DRV 0, DRV 2, . . . DRV 14 via PBCs 82 while the FC-AL 64 is loop-connected to odd-numbered disk drives DRV 1, DRV 3, . . . DRV 13 via PBCs 82.

Incidentally, a front interface connection Fibre Channel 51 and a back interface connection Fibre Channel 52 on the controller 30 are respectively single paths.

The data controllers 23 and 33 are connected to each other via a bus 81 and either of the data controllers may transfer commands or data to the other data controller via the bus 81. For example, when both the controllers 20 and 30 share the task of accessing a single logical volume, they can transfer write data or read data therebetween.

The controllers 20 and 30 can control the disk drives DRV 0, DRV 2, . . . DRV 14 at a RAID level (for example, 0, 1, or 5) regulated by a so-called RAID system. In the RAID system, plural disk drives DRV 0, DRV 2, . . . DRV 14 are managed as one group (hereinafter called a "RAID group"). Logical volumes, which are access units from the host computer 70, are set for this RAID group. Each logical volume is given an identifier called a Logical Unit Number (LUN).

Incidentally, PBCs 101 and 102 are provided between the PBC 27 and the FC-ALs 61 and 62. If a failure occurs in the FC-AL 61, the PBC 101 connects the back interface connection Fibre Channel 42 to the FC-AL 63 via a Fibre Channel 111 (shown with a dotted line). On the other hand, if a failure occurs in the FC-AL 62, the PBC 102 connects the back interface connection Fibre Channel 42 to the FC-AL 64 via a Fibre Channel 112 (shown with a dotted line).

Likewise, PBCs 103 and 104 are provided between the PBC 37 and the FC-ALs 63 and 64. When a failure occurs in the FC-AL 63, the PBC 103 connects the back interface connection Fibre Channel 52 to the FC-AL 61 via a Fibre Channel 113 (shown with a dotted line). On the other hand, when a failure occurs in the FC-AL 64, the PBC 104 connects the back interface connection Fibre Channel 52 to the FC-AL 62 via a Fibre Channel 114 (shown with a dotted line).

Supposing that all the PBCs 101 to 104 in the controllers 20 and 30 are connected to the Fibre Channels 111 to 114 so that the back interface connection Fibre Channels 42 and 52 are connected to the other controller's FC-ALs, the situation would be the same as the one shown in FIG. 1 of Japanese Patent Laid-Open Publication No. 2000-187561, where a plurality of disk drives are connected to Fibre Channel loops that connect both controllers.

The following explanation assumes that the FC-AL 61 is an operating FC-AL for the controller 20, the FC-AL 62 is a standby FC-AL for the controller 20, the FC-AL 63 is a standby FC-AL for the controller 30, and the FC-AL 64 is an operating FC-AL for the controller 30.

Figure 2:
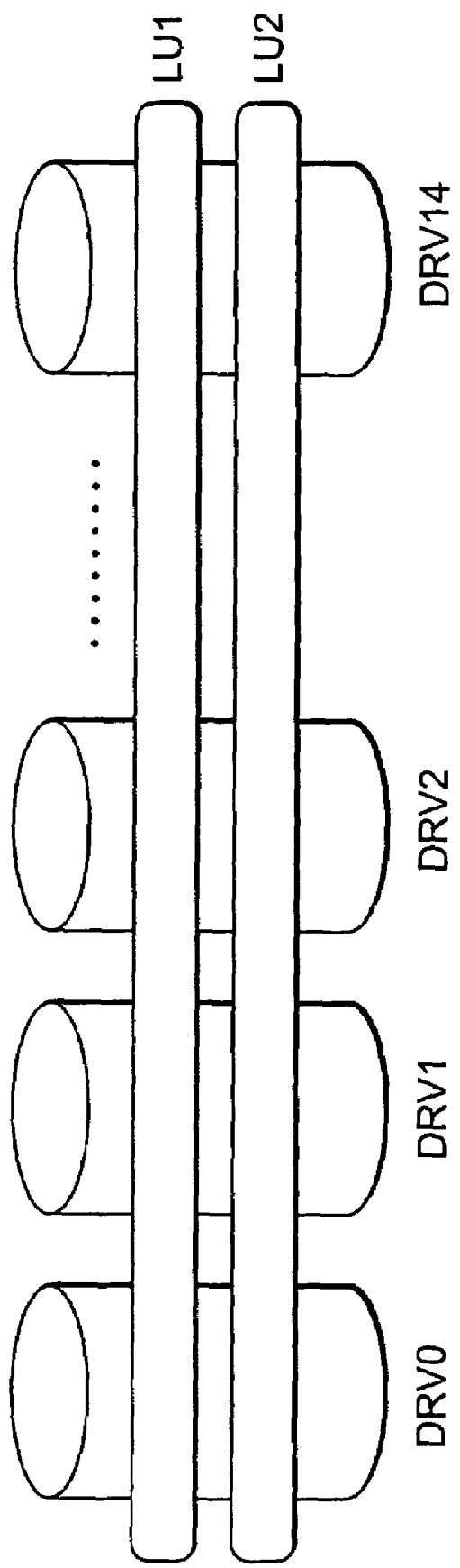
FIG. 2 illustrates logical volumes.

FIG. 2 shows logical volumes set for the plural disk drives DRV 0 to DRV 14. In this figure, two logical volumes LU 1 and LU 2 are shown for the ease of explanation. An operating system (OS) installed on the host computer 70 accesses the disk array device 10 while specifying a logical volume name. If only one physical disk constitutes the logical volumes LU 1 and LU 2 and a failure occurs in the physical disk, its logical volumes LU 1 and LU 2 can no longer be used. In order to avoid this situation, in the RAID system, the logical volumes LU 1 and LU 2 are formed on the plurality of different disk drives DRV 0 to DRV 14. Moreover, the operating FC-AL 61 in the controller 20 is connected to the even-numbered disk drives DRV 0, DRV 2, DRV 4, . . . DRV 14 while the operating FC-AL 64 in the controller 30 is connected to the odd-numbered disk drives DRV 1, DRV 3, DRV 5, . . . DRV 13. Accordingly, it is not necessarily the case that only one of the controllers 20 and 30 accesses the logical volumes LU1 and LU2, but both controllers 20 and 30 may access them while cooperating with each other under cooperation controls.

Now, when write access is made from the host computer 70 to the logical volume LU 1 or LU2 in the disk array device 10, write data stored in the cache memory 24 in the controller 20 is also stored in the cache memory 34 in the controller 30 via the bus 81. Such duplication of data allows failover to the other controller if a failure occurs in one of the controllers 20 and 30. When the write data has been stored in the cache memories 24 and 34, the disk array device 10 notifies the host computer 70 of the completion of write access. Then, the controller 20 makes write access to the disk drives DRV 0, DRV 2, . . . and DRV 14 via the FC-AL 61. Because the write access target logical volumes LU1 or LU 2 involve not only the even-numbered disk drives DRV 0, DRV 2, . . . DRV 14, but the odd-numbered disk drives DRV 1, DRV 3, . . . DRV 13, the controller 30 makes write access to the odd-numbered disk drives DRV 1, DRV 3, . . . DRV 13 via the FC-AL 64.

On the other hand, when read access is made from the host computer 70 to the logical volume LU 1 or LU 2 in the disk array device 10, the controller 20 checks whether or not read access target data exists in the cache memory 24. If the read access target data exists in the cache memory 24, the controller 20 reads and transmits it to the host computer 70. If it does not exist in the cache memory 24, the controller 20 makes read access to the disk drives DRV 0, DRV 2, . . . DRV 14 via the FC-AL 61. Because the read access target logical volumes LU 1 or LU 2 involve not only the even-numbered disk drives DRV 0, DRV 2, . . . DRV 14, but the odd-numbered disk drives DRV 1, DRV 3, . . . DRV 13, the controller 30 makes read access to the odd-numbered disk drives DRV 1, DRV 3, . . . DRV 13 via the FC-AL 64. The read data read by the controllers 20 and 30 is dual-written in the cache memories 24 and 34.

Thus, because the controllers 20 and 30 cooperate, under the cooperation control, in making access to one logical volume, their processing loads can be equalized. Embodiment 1 shows an example where the processing loads on the controllers 20 and 30 are equalized by dividing the disk drives into two, the even-numbered disk drives DRV 0, DRV 2, . . . DRV 14 and the odd-numbered disk drives DRV 1, DRV 3, . . . DRV 13. However, such equalization of the processing loads on the controllers 20 and 30 may be conducted by dividing the disk drives so that the number of disk drives individually managed by the controllers is substantially equal, for example, the disk drives DRV 0 to DRV 7 and the disk drives DRV 8 to DRV 14.

According to Embodiment 1, all the disk drives DRV 0 to DRV 14 are connected to the controller 20 or 30 only by controlling the two PBCs 27 and 37 and connecting the back interface connection Fibre Channels 42 and 52 to the operating FC-ALs 61 and 64. Accordingly, it is unnecessary to control the individual PBCs 82 on the FC-ALs 61 to 64, thereby allowing simple control. Moreover, because the CPUs 21 and 31 do not distinguish between the operating FC-ALs and the standby FC-ALs, but recognize them as a single device, control of the device can be simplified.

Incidentally, if a failure occurs in any of the ports of the disk drives DRV 0 to DRV 14 connected to the FC-ALs 61 to 64, it prevents packet flow to the relevant FC-AL 61, 62, 63 or 64 connected to the faulty port and results in a loop failure. Because the loop failure disables access to the disk drives DRV 0 to DRV 14, such failure must be avoided. Hereinafter, failure avoidance processing will be explained with reference to FIG. 3 assuming, for ease of explanation, that a failure occurs in a port on one side of the disk drive DRV 2 connected to the FC-AL 61.

Figure 3:
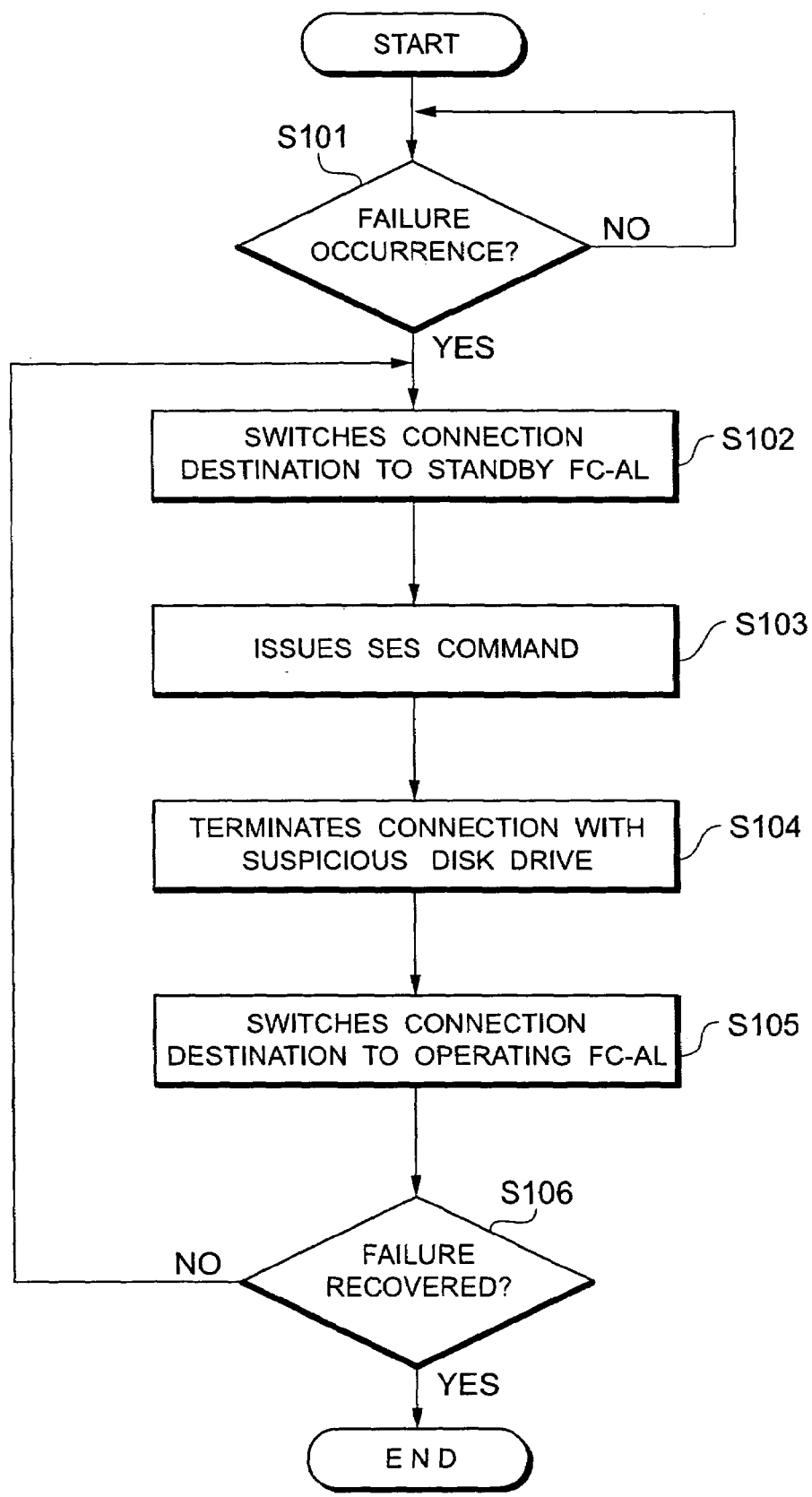
FIG. 3 illustrates failure recovery processing according to Embodiment 1.

FIG. 3 illustrates a loop failure avoidance processing routine. When a failure occurs in a port P1 of the disk drive DRV 2 connected to the FC-AL 61 (S101; Yes), the CPU 21 switches the connection destination of the back interface connection Fibre Channel 42 from the FC-AL 61 (operating FC-AL) to the FC-AL 62 (standby FC-AL) (S102). Occurrence of the failure is detected upon, for example, detection of an error message or non-receipt or timeout of an acknowledge signal, and notified from the Fibre Channel Protocol controller 25 to the CPU 21 via the data controller 23.

Then, the CPU 21 transmits an SES command from the FC-AL 62 via an SES drive to the enclosure controller 28 or 38 (S103). This SES command includes an Arbitrated Loop Physical Address (AL_PA) on the FC loop to which a suspicious disk drive (a disk drive in which a failure is presumed to have occurred) is connected.

Having received the SES command, the enclosure controller 28 or 38 controls a relevant PBC 82 and terminates connection between the FC-AL 61 and the suspicious disk drive specified by the AL_PA (S104). For example, if the disk drive DRV 0 is specified as the suspicious disk drive, connection between the disk drive DRV 0 and the FC-AL 61 is terminated.

Then the CPU 21 switches the connection destination of the back interface connection Fibre Channel 42 from the FC-AL 62 to the FC-AL 61 (S105) and diagnoses the loop as to whether or not the loop failure of the FC-AL 61 has been solved (S106). In Embodiment 1, because it is assumed that the failure occurred in the port P1 (port at one side) of the disk drive DRV 2, even if the connection to the disk drive DRV 0 is terminated, the loop failure in the FC-AL 61 will not be solved.

If the loop failure cannot be solved (S106; No), steps S102 to S105 are repeated while changing the suspicious disk drive from one to another until it is solved. When the connection between the disk drive DRV 2 and the FC-AL 61 is terminated, the loop failure in the FC-AL 61 is solved.

Thus, even if a loop failure occurs in the operating FC-AL 61, it can be solved by switching the connection destination of the back interface connection Fibre Channel 42 to the standby FC-AL 62, transmitting an SES command to the enclosure controller 28 or 38 via an SES drive and terminating the connection between the suspicious disk drive and the FC-AL 61 by means of the relevant PBC 82. Moreover, in this case, because there is no failure in the port P2 of the disk drive DRV 2 which is connected to the FC-AL 63, an SES command can be transmitted from the FC-AL 63 or 64 via an SES drive to the enclosure controller 28 or 38 to terminate the connection between the suspicious disk drive and the FC-AL 61.

Incidentally, if a failure occurs in both ports P1 and P2 of the disk drive DRV 2, the both FC-ALs 61 and 63 have a Loop Initialization Select Master (LISM) failure. In this case, the connection to the suspicious disk drive can be terminated by controlling the PBC 27, switching the connection destination of the back interface connection Fibre Channel 42 to the standby FC-AL 62, and transmitting an SES command to the enclosure controller 28 or 38 via an SES drive, or by transmitting it from the operating FC-AL 64, which is connected to the back interface connection Fibre Channel 52 at all times, via an SES drive to the enclosure controller 28 or 38.

A loop failure in the FC-AL 61, 62, 63 or 64 may be caused also by an intermittent failure due to breakage or age deterioration of the FC-AL 61, 62, 63, or 64 itself or by an intermittent failure due to a failure in a device (for example, a PBC 82) provided therein. Loop failures due to such causes cannot be solved by terminating the connection between the FC-AL 61, 62, 63 or 64 and the disk drives DRV 0 to DRV 14, accordingly, the connection destinations of the back interface connection Fibre Channels 42 and 52 have to be switched to the standby FC-ALs 62 and 63.

According to Embodiment 1, although there is only one path for each of the back interface connection Fibre Channels 42 and 52 in the controllers 20 and 30, excellent fault tolerance can be achieved because the controllers 20 and 30 provide duplication (a redundant structure) for the FC-ALs interface-connected to the disk drives DRV 0 to DRV 14.

Figure 4:
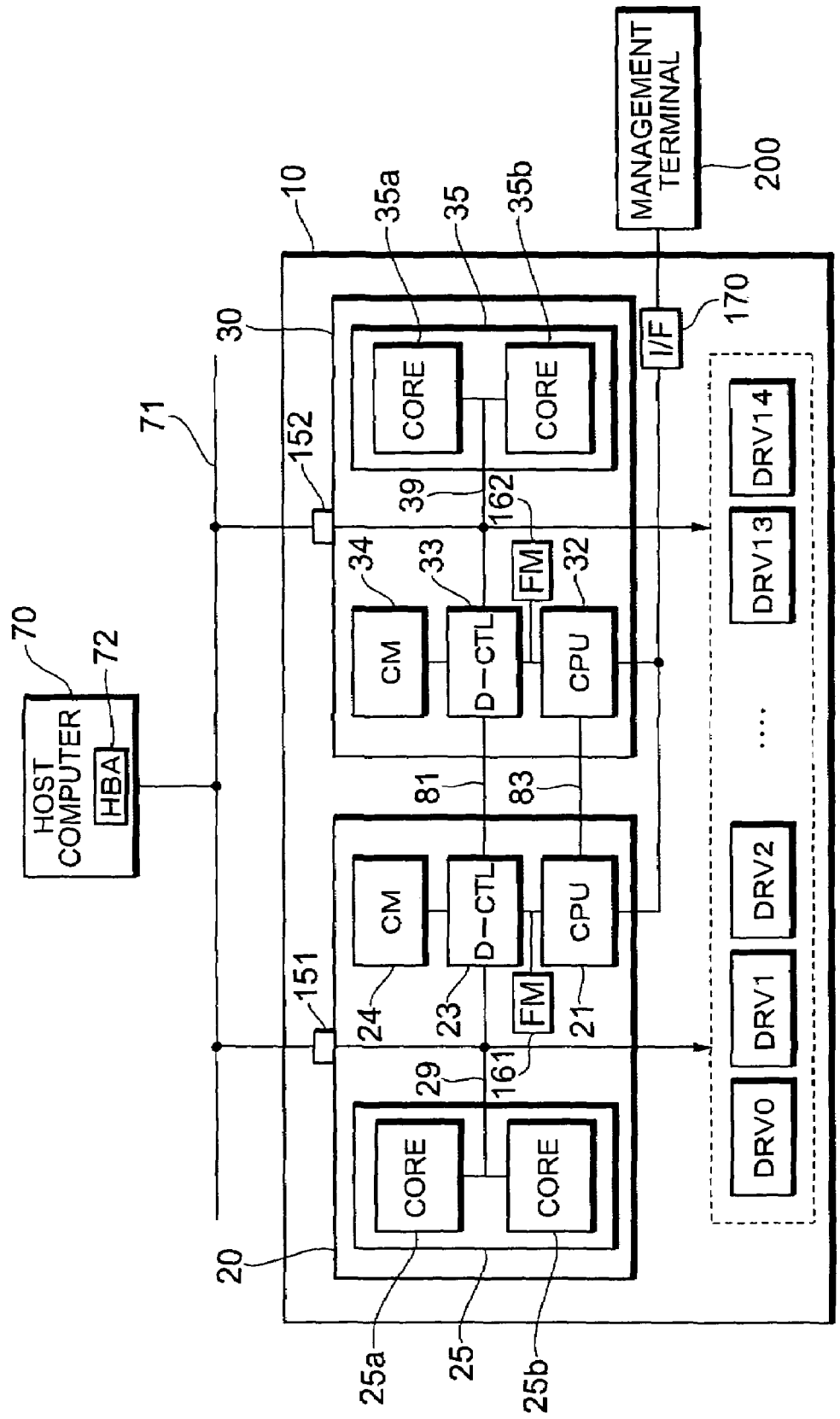
FIG. 4 shows another structure of the disk array device according to Embodiment 1.

FIG. 4 shows a main part of the disk array device 10 focusing on the Fibre Channel Protocol controllers 25 and 35. For ease of explanation, some circuit elements in the controllers (such as the local memories 22 and 32, and the enclosure controllers 28 and 38) and hardware around the back interface (such as the PBCs 27, 37, 101, 102, 103, and 104, and the FC-ALs 61, 62, 63, and 64) are omitted.

The Fibre Channel Protocol controller 25 has a circuit structure where a front-side core 25a and a back-side core 25b are provided in a single LSI. The core 25a is a circuit for controlling a Fibre Channel Protocol used for data communication with the host computer 70 and, for example, has the function of accepting block access requests from the host computer 70 based on the Fibre Channel Protocol. On the other hand, the core 25b is a circuit for controlling a Fibre Channel Protocol used for input/output of data to/from the disk drives DRV 0 to DRV 14, and, for example, executes processing regarding requests for data input/output to/from the disk drives DRV 0 to DRV 14 based on a protocol regulating commands or the like for controlling the disk drives DRV 0 to DRV 14. The core 25a and the core 25b are separately controlled by independent modules.

A PCI-X bus 29 connects a front interface of the controller 20, a back interface, the Fibre Channel Protocol controller 25 and the data controller 23 to each other. It diverges in two directions inside the Fibre Channel Protocol controller 25 and is connected to the cores 25a and 25b. A flash memory (FM) 161 is branch-connected to the PCI-X bus connecting the CPU 21 and the data controller 23, so that minimum necessary failure information can be saved therein when the controller locks itself out. Here, the flash memory is used as an example of a memory device for storing minimum necessary failure information, however, other nonvolatile memories can be used. A GBIC module 151 is provided to the front interface of the controller 20. The communication network 71 is, for example, a SAN configured by an optical fiber network. A Host Bus Adapter (HBA) 72 is provided to an interface between the host computer 70 and the communication network 71.

Incidentally, the circuit structure inside the controller 30 is the same as that of the controller 20, therefore, explanations are omitted. The reference numeral 35a indicates a front-side core, 35b indicates a back-side core, 39 indicates a PCI-X bus, 152 indicates a GBIC module, and 162 indicates a flash memory.

The CPU 21 and the CPU 31 in the controllers 20 and 30 are connected to each other via a communication line 83 so that they can exchange information in case of a failure in one of the controllers.

The disk array device 10 is connected to a management terminal 200 for system maintenance or management via a communication interface 170, and data communication is conducted therebetween based on a predetermined communication protocol such as Fibre Channel Protocol or TCP/IP. If their communication protocol is Fibre Channel Protocol, the communication interface 170 may have a GBIC module and a Fibre Channel Protocol controller, but if it is TCP/IP, the communication interface 170 may have a LAN port connector and an LSI for controlling the TCP/IP. With operation by an operator via the management terminal 200, for example, it is possible to make settings for logical volumes defined on the disk drives DRV 0 to DRV 14, add or delete disk drives to/from the disk drives DRV 0 to DRV 14, and change settings for the RAID configuration (for example, a change from RAID level 5 to RAID level 1). As will be described later, the management terminal 200 also has the function of, in the case of failure in the controller 20 or 30, obtaining failure information saved in the cache memory 24 or 34 and analyzing it.

Incidentally, the management terminal 200 may be included in the disk array device 10 or be set up as an external device.

Figure 5:
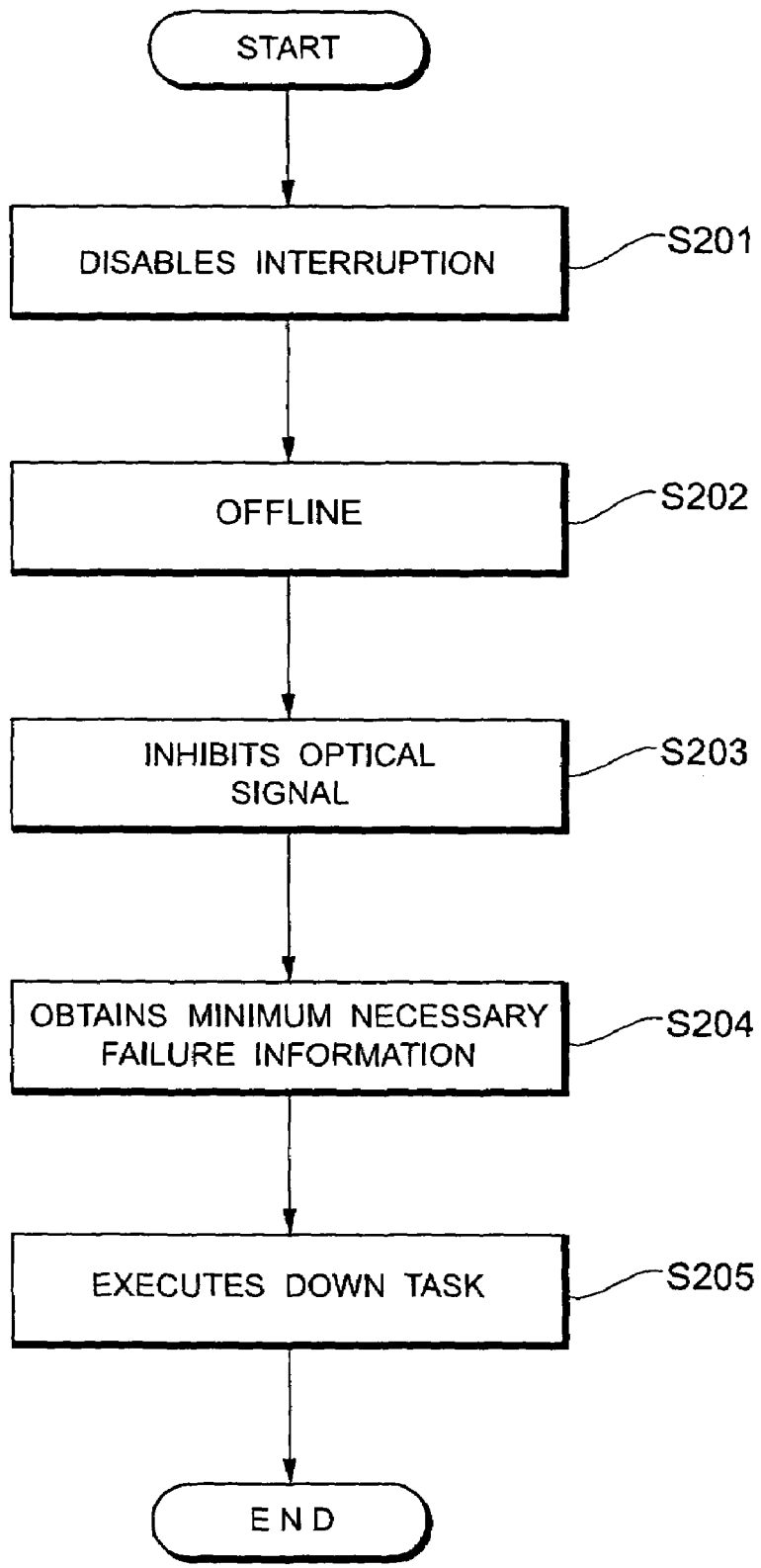
FIG. 5 illustrates controller lock-out processing according to Embodiment 1.

FIG. 5 shows a processing procedure for controller lock-out processing. This processing is executed by a controller having a failure that requires lock-out, and locking itself out on its own judgment. Here, explanations will be given for a case where, for example, a failure occurs in the controller 30 and the controller 30 locks itself out on its own judgment. Upon an occurrence of a failure that requires lock-out of the controller 30, the CPU 31 disables interruption requests from the Fibre Channel Protocol controller 35 connected thereto (S201), shuts off negotiations with the host computer 70 being conducted prior to the commencement of data communication based on the Fibre Channel Protocol (S202), inhibits optical signal output from the GBIC module 152 to the host computer 70 (S203), and saves minimum necessary failure information to the flash memory 162 (S204). This series of steps S201 to S204 may be executed upon the occurrence of a failure in the controller 30, in some cases as an extension of a controller task currently being executed by the CPU 31, or in other cases, as an extension of processing for an interruption request from the Fibre Channel Protocol controller 35.

Thus, because negotiations in progress prior to the commencement of the data communication based on the Fibre Channel Protocol are shut off, data communication based on the protocol can no longer be commenced between the host computer 70 and the disk array device 10. This prevents the occurrence of events caused by data communication between the host computer 70 and the disk array device 10, and disables interruption requests from the Fibre Channel Protocol controller 35 to the CPU 31. However, where no negotiations have occurred between the host computer 70 and the disk array device 10 for a long time, events for that situation take place and interruption requests are made to the CPU 31. Such interruption requests from the Fibre Channel Protocol controller 35 to the CPU 31 can also be shut off by disabling them. As a result, the CPU 31 can execute down task processing to lock-out the controller 30 (S205). The down task processing includes, for example, processing to save failure information in the cache memory 34. This down task is set as a higher priority than usual controller tasks but lower than the processing task for interruption requests from the Fibre Channel Protocol controller 35.

Incidentally, when the optical signal output from the GBIC module 152 to the host computer 70 is inhibited, responses from the controller 30 to the host computer 70 are no longer made, accordingly, the host computer 70 judges that a failure has occurred in the controller 30 and conducts path switching.

In this specification, the down task processing (S205) by the CPU 31 and the preliminary processing (S201 to S204) for making it easy for the CPU 31 to execute the down task processing are together called the "lock-out processing." The preliminary processing is not necessarily executed in the aforementioned order, and the sequence of the steps may be altered. Moreover, the optical signal inhibition processing (S203) may be included in the down task processing because it is for making the host computer 70 conduct path switching.

By this lock-out processing, the interruption requests from the Fibre Channel Protocol controller 25 or 35 to the CPU 21 or 31 can be disabled without initializing the Fibre Channel Protocol controller 25 or 35, and accordingly, the CPU 21 or 31 can execute the down task processing to lock itself out upon the occurrence of failure. Even if the down task processing cannot be executed, or even if the down task was executed but a failure occurs in the cache memory 24 or 34 and failure information cannot be read from it, the minimum necessary failure information is saved in the flash memory 161 or 162, therefore, the cause of failure can be analyzed.

Figure 6:
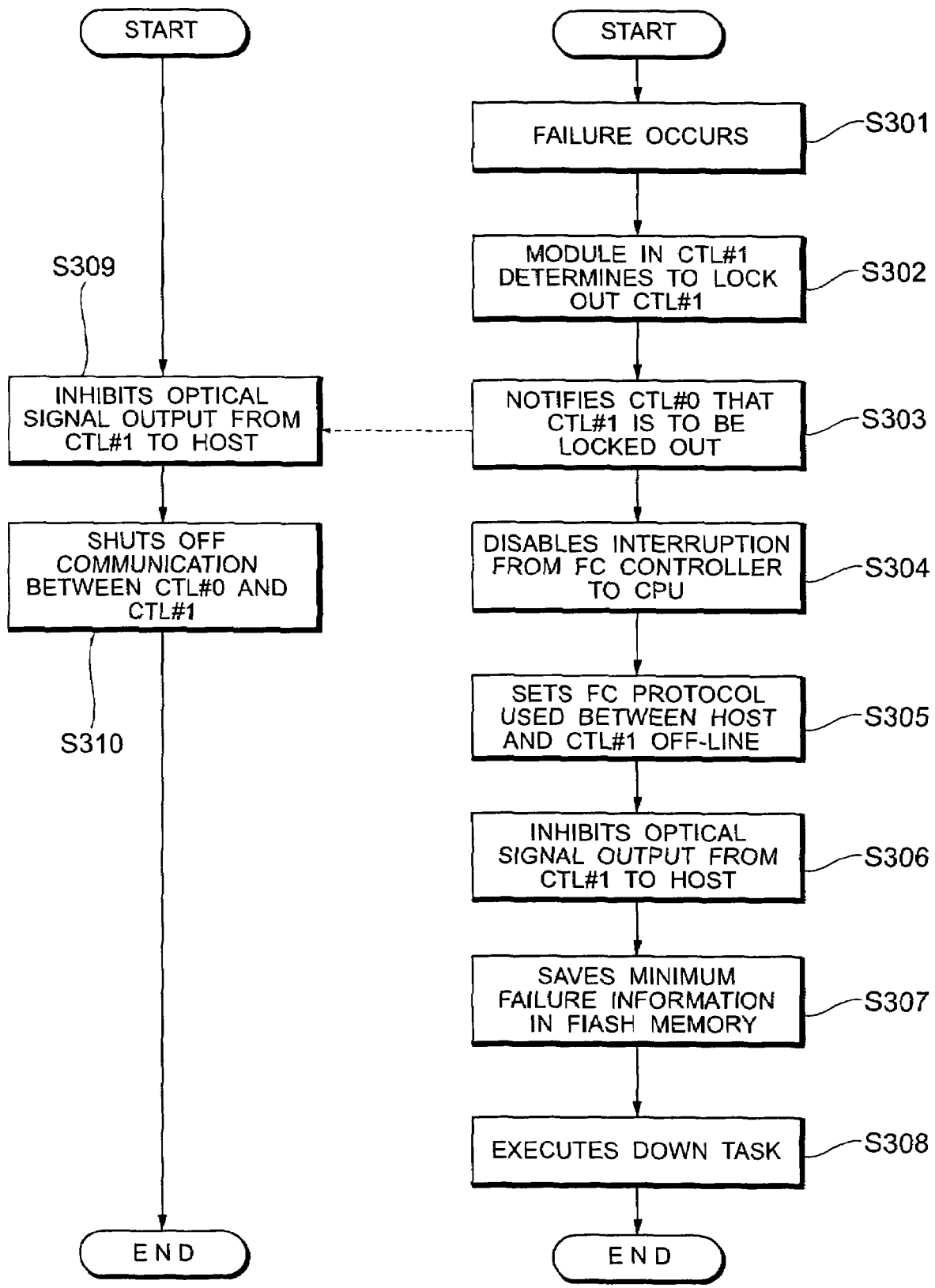
FIG. 6 shows a controller lock-out sequence according to Embodiment 1.

FIG. 6 shows a sequence describing a processing procedure for locking out a controller by means of mutual communication between the controllers. Here, it is assumed that a failure that requires lock-out occurs in the controller 30 and the controller 30 locks itself out on its own judgment. For ease of explanation, the controller 20 is called "CTL#0" and the controller 30 is called "CTL#1."

When a failure that requires lock-out occurs in the CTL#1 (S301), a module in the CTL#1 determines the lock-out of CTL#1 (S302). Any module can be used as the module for determining the lock-out of the CTL#1, for example, a module for determining what kind of recovery processing is to be executed, or a module for executing appropriate recovery processing according to the type of failure factor, if the module is prepared in advance.

Subsequently, the CTL#1 notifies the CTL#0 that it is to be locked out (S303). Moreover, the CTL#1 disables interruption requests from the Fibre Channel Protocol controller 35 to the CPU 31 (S304), shuts off negotiations with the host computer 70 being conducted prior to data communication based on Fibre Channel Protocol (S305), inhibits optical signal output from the GBIC module 152 to the host computer 70 (S306), saves minimum necessary failure information to the flash memory 162 (S307), and executes the down task processing (S308).

On the other hand, when the CTL#0 receives notification of controller lock-out from the CTL#1, it controls the CTL#1 so that the optical signal output from the GBIC module 152 to the host computer 70 is inhibited (S309). Then, it shuts off data communication via the bus 81, which is a data transfer path between the controllers, and the communication line 83, which is for exchanging information between the controllers (S310). An execution sequence of S309 and S310 is not limited to the above, and it may be changed or they may be executed at the same time.

Thus, in the case of CTL#1's lock-out on its own judgment, aside from the lock-out processing (S304 to S308) by CTL#1 for closing itself, the CTL#0 controls the CTL#1 (S309) so that even if the lock-out processing by the CTL#1 fails, the host computer 70 can detect the occurrence of failure in the CTL#1 and conduct the path switching.

Incidentally, the lock-out processing (S304 to S308) by the CTL#1 and the optical signal output inhibition processing (S309) by the CTL#0 proceed asynchronously because they do not adjust their timing by checking the progress of each other's processing while being executed. The processing may be executed synchronously, in that case, considering the possibility of loss of synchronization, the CTL#0 may execute the optical signal output inhibition processing (S309) while ignoring the progress of the CTL#1's optical output inhibition processing (S306).

Figure 7:
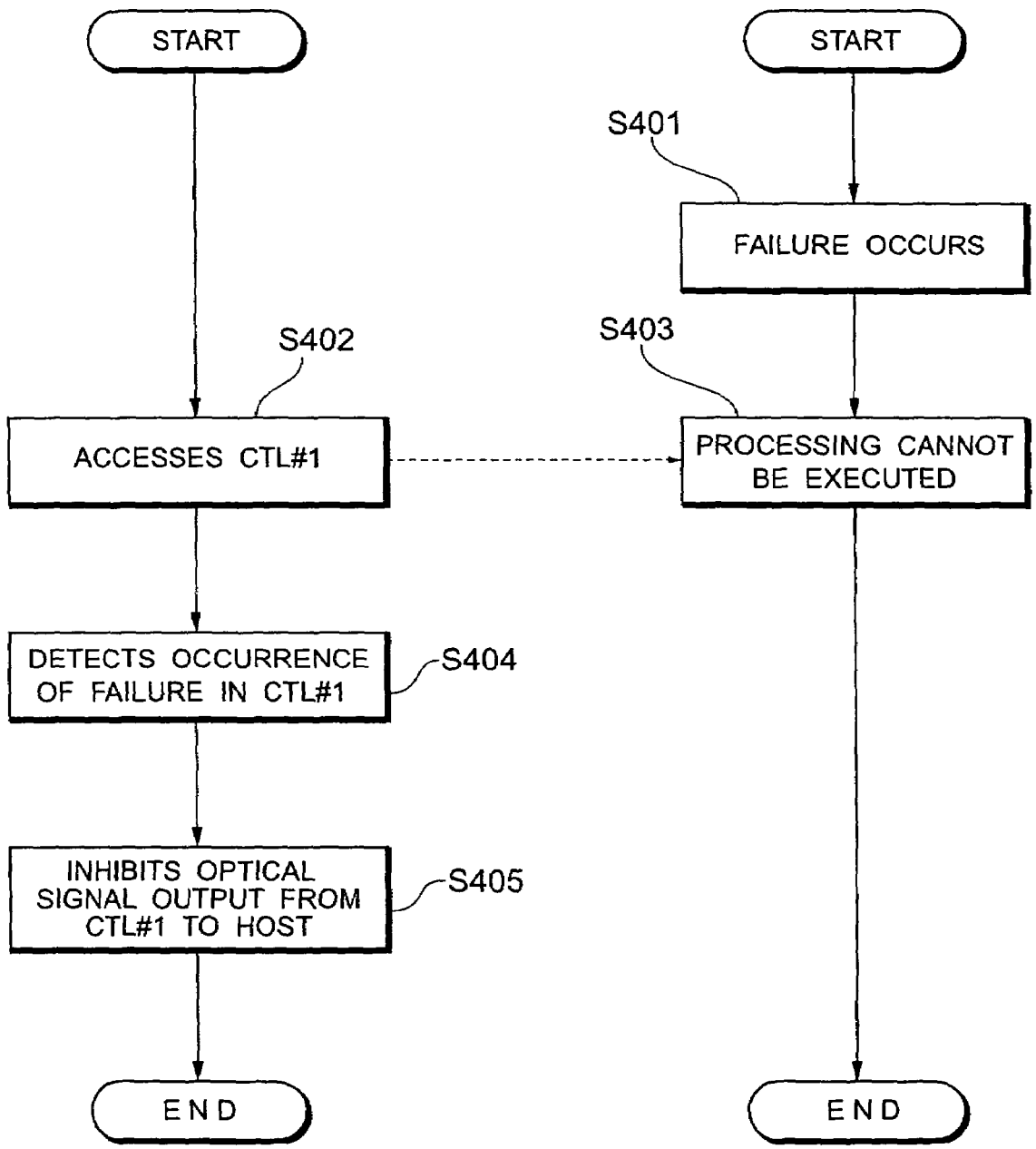
FIG. 7 illustrates another controller lock-out sequence according to Embodiment 1.

FIG. 7 shows another sequence describing a processing procedure for controller lock-out by means of mutual communication between the controllers. Here, it is supposed that a failure that requires lock-out occurs in the controller 30, the CPU 31 or the cache memory 34 fails to operate properly, and the controller 20 detects that the controller 30 can no longer continue CPU processing due to those reasons. For ease of explanation, the controller 20 is called "CTL#0" and the controller 30 is called "CTL#1."

After a failure occurs in the CTL#1 (S401), when a certain module in the CTL#0 accesses the CTL#1 to exchange information (S402), because the CTL#1 can no longer execute processing (S403), another module in the CTL#0 detects the occurrence of a failure in the CTL#1 (specifically, CPU processing inoperability) (S404). The module for detecting the occurrence of failure in the CTL#1 may be, for example, the module that tried to exchange information with the CTL#1 or, if a dedicated module is prepared in advance for exchanging information with the CTL#1 and is configured to detect that the CTL#1 makes no response based on timeouts or similar, that module may be used. When the CTL#1 is unable to conduct CPU processing, it can no longer execute its own lock-out processing, accordingly, the CTL#0 controls the CTL#1 so that optical signal output from the GBIC module 152 to the host computer 70 is inhibited (S405).

Thus, in the case where the CTL#1 cannot execute its own lock-out processing, theCTL#0 controls the CTL#1 to inhibit optical signal output from the GBIC module 152 to the host computer 70 (S405), therefore, the host computer 70 detects the occurrence of a failure in the CTL31 and conducts the path switching.

Figure 8:
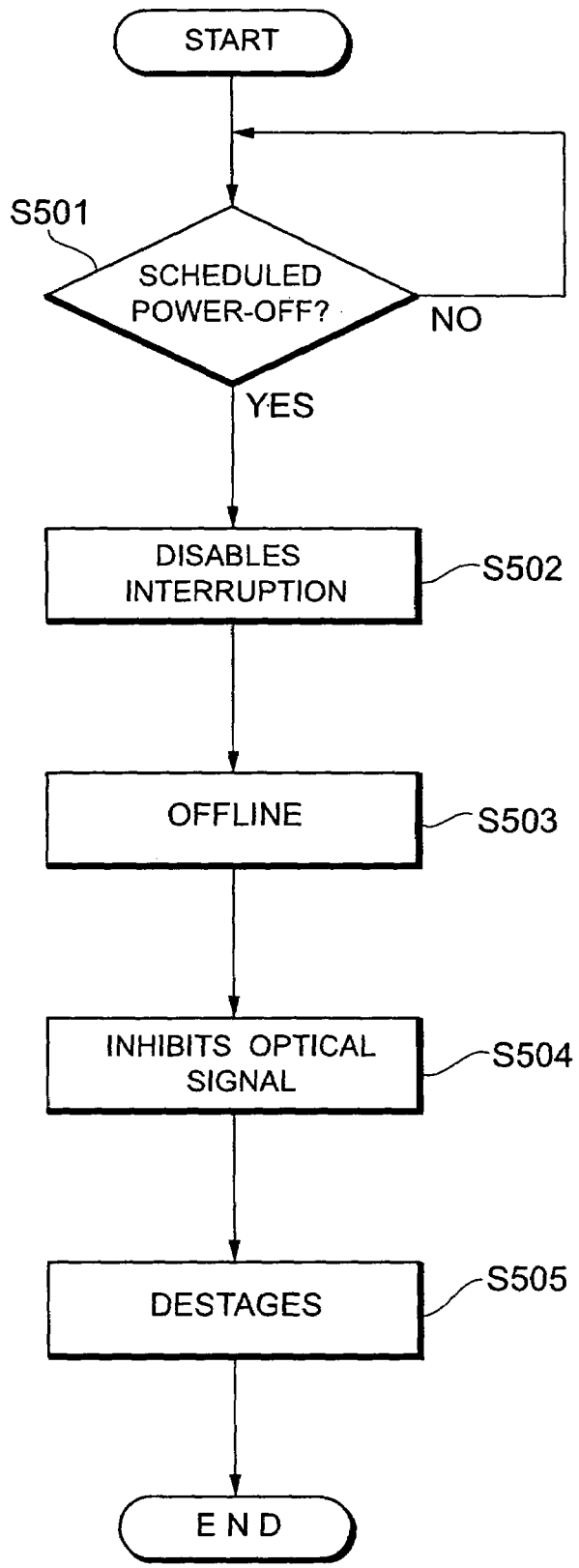
FIG. 8 illustrates scheduled power-off processing according to Embodiment 1.

FIG. 8 is a flow chart describing a processing procedure executed by the CPUs 21 and 31 in the controllers 20 and 30 when the disk array device 10 conducts a scheduled power-off. The scheduled power-off means to turn off the main power source of the disk array device 10 systematically. Here, explanations will be given taking, as an example, the processing by the CPU 31 in the controller 30. When a scheduled power-off is to be conducted (S501; Yes), the CPU 31 disables interruption requests from the Fibre Channel Protocol controller 35 to the CPU 31 (S502), shuts off negotiations with the host computer 70 being conducted prior to the commencement of data communication based on Fibre Channel Protocol (S503), inhibits optical signal output from the GBIC module 152 to the host computer 70 (S504), and destages dirty data remaining in the cache memory 34 to the disk drives DRV0 to DRV 14 (S505).

The destage processing (S505) is one of the controller tasks executed by the CPU 31 and is set as a lower priority than the interruption requests from the Fibre Channel Protocol controller 35 to the CPU 31. However, it is possible to make it easy for the CPU 31 to execute the destage processing by executing the interruption disabling processing (S502) and the off-line processing (S503) when the scheduled power-off of the disk array device 10 is started.

Figure 9:
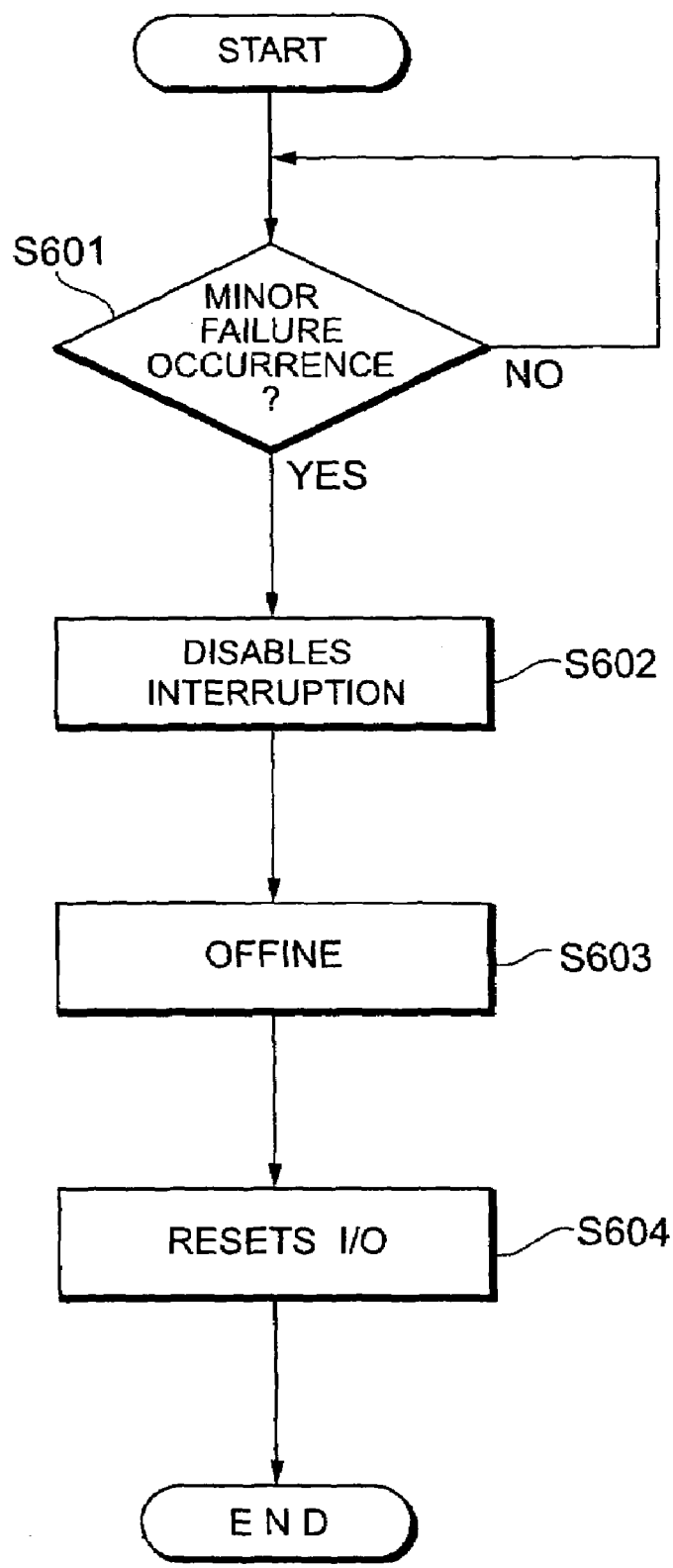
FIG. 9 illustrates I/O reset processing according to Embodiment 1.

FIG. 9 is a flow chart describing a processing procedure for resetting processing for I/O requests from the host computer 70 when a minor failure occurs in the controller 20 or 30. A minor failure refers to a failure that does not require lock-out of the controller 20 or 30, but prevents execution of normal I/O processing. Here, explanations will be given for the processing by the CPU 31 in the controller 30 as an example. When a minor failure occurs in the controller 30 (S601; Yes) and it becomes necessary to reset the processing for I/O requests from the host computer 70, the CPU 31 disables interruption requests from the Fibre Channel Protocol controller 35 to the CPU 31 (S602), shuts off negotiations with the host computer 70 being conducted prior to the commencement of data communication based on Fibre Channel Protocol (S603), and resets the processing for I/O requests from the host computer 70 (S604).

Reset of the I/O processing means, for example, to reset internal information such as command information received from the host computer 70. It is one of the controller tasks executed by the CPU 31 and is set as a lower priority than the interruption requests from the Fibre Channel Protocol controller 35 to the CPU 31. However, it is possible to make it easy for the CPU 31 to reset the I/O processing by executing the aforementioned interruption disabling processing (S602) and the off-line processing (S603) when the minor failure occurs in the controller 30.

EMBODIMENT 2

Figure 10:
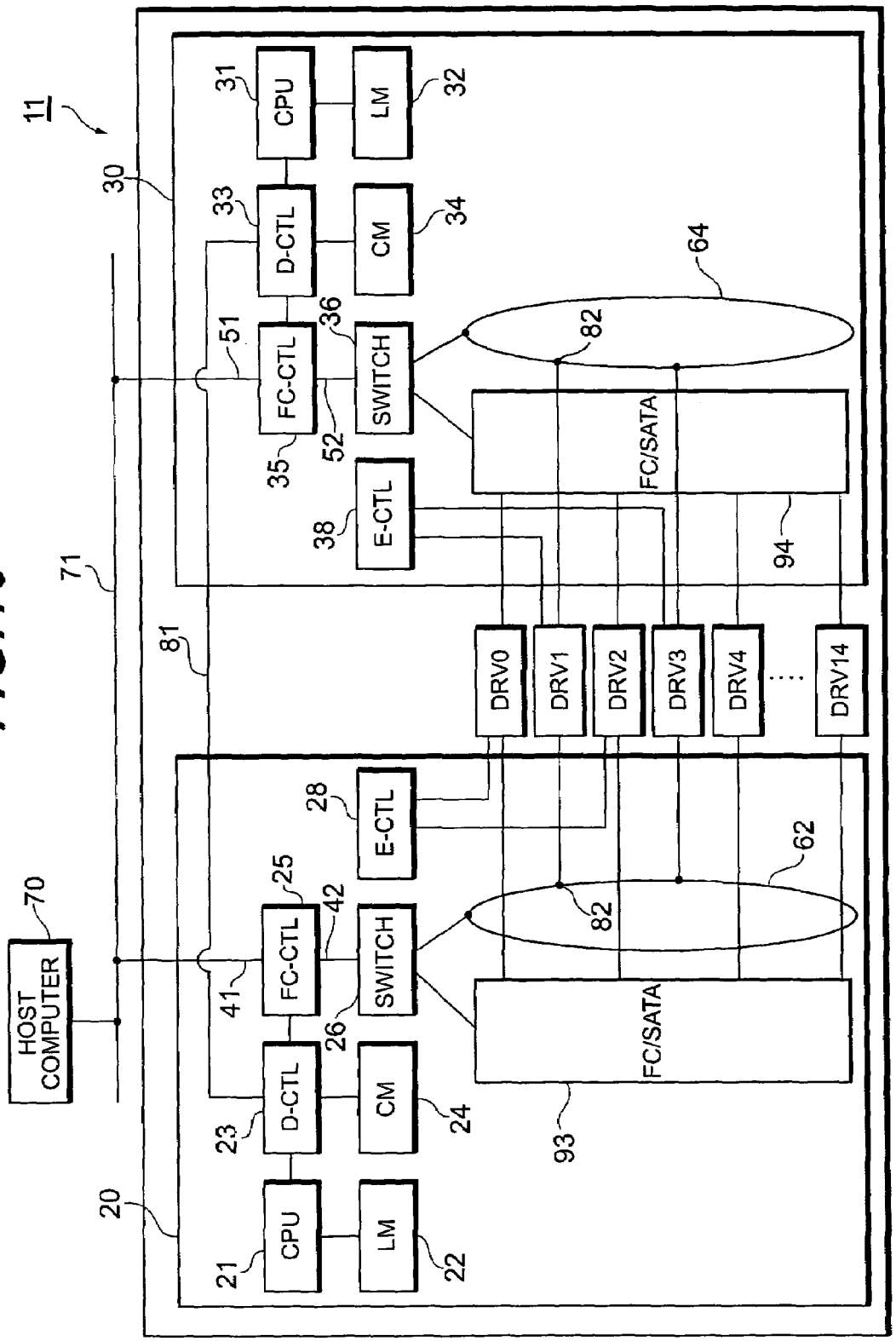
FIG. 10 shows a structure of a disk array device according to Embodiment 2.

FIG. 10 shows a structure of a disk array device 11 according to Embodiment 2. Reference numerals identical to those in FIG. 1 indicate the same elements, therefore, detailed explanations thereof will be omitted. In Embodiment 2, switches 26 and 36 are provided, in place of the aforementioned PBCs 27 and 37, as connection switching circuits for the back interface connection Fibre Channels 42 and 52. The switch 26 is connected, via ports having different port IDs, to an FC-SATA conversion interface 93 and an FC-AL 62. Likewise, the switch 36 is connected, via ports having different port IDs, to an FC-SATA conversion interface 94 and an FC-AL 64. The switches 26 and 36 recognize the devices connected thereto as independent devices and execute intelligent switching controls.

The FC-SATA conversion interfaces 93 and 94 are circuits for converting Fibre Channel Protocol to a SATA protocol and are point-to-point connected to the even-numbered disk drives DRV 0, DRV 2, . . . DRV 14. For example, inexpensive serial ATA disk drives may be used as the even-numbered disk drives DRV 0, DRV 2, . . . DRV 14. The FC-ALs 62 and 64 are loop-connected to the odd-numbered disk drives DRV 1, DRV 3, . . . DRV 13. For example, high-performance Fibre Channel disk drives having high response speed may be used as the odd-numbered disk drives DRV 1, DRV 3, . . . and DRV 13.

With the disk array device 11 having a plurality of disk drives with different response speeds when, for example, a certain piece of data experiences temporal changes in its value, the data can be moved from a Fibre Channel disk drive to a serial ATA disk drive or vice versa in a single chassis. For example, frequently-accessed data or data requiring high speed response may be stored in Fibre Channel disk drives while data accessed at relatively infrequent intervals or data not necessarily requiring high speed response may be stored in serial ATA disk drives. The plurality of kinds of disk drives having different response speeds may include, for example, a mix of SCSI disk drives, parallel ATA disk drives, serial ATA disk drives, and Fibre Channel disk drives.

According to Embodiment 2, because the switches 26 and 36 are used, the connection destinations of the back interface connection Fibre Channels 42 and 52 can be switched intelligently. Accordingly, a plurality of kinds of high-performance disk drives can be connected to ports of the switches 26 and 36 and storage destinations of pieces of data can be changed in a single chassis based on their temporal changes in value.

EMBODIMENT 3

Figure 11:
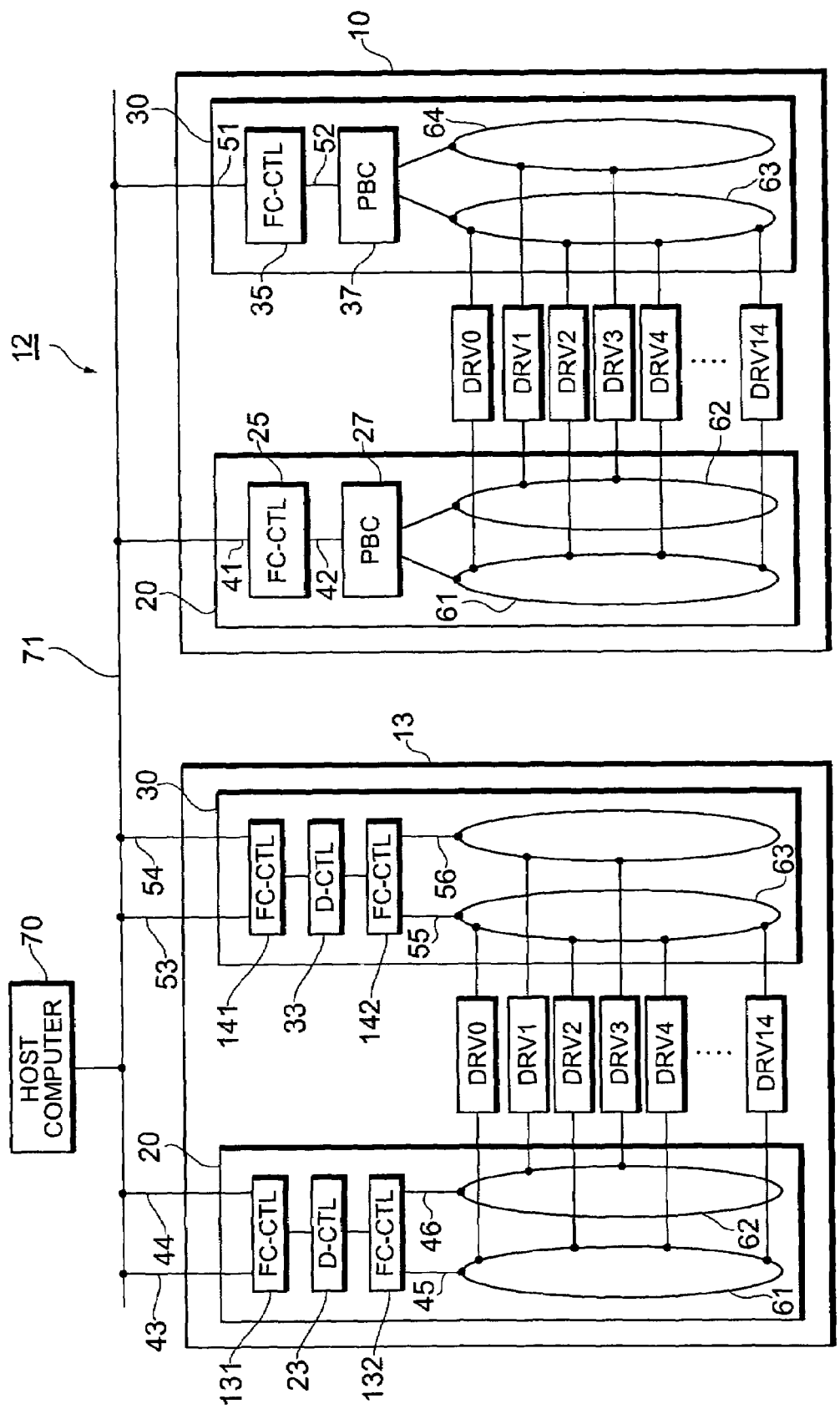
FIG. 11 shows a structure of a disk array system according to Embodiment 3.

FIG. 11 shows a structure of a storage system 12 according to Embodiment 3. Reference numerals identical to those in FIG. 1 indicate the same elements, accordingly, detailed explanations thereof will be omitted. The storage system 12 has a host computer 70 and disk array devices 10 and 13, each being connected via a communication network 71 to one another. The disk array device 10 has the same structure as the one explained with regard to Embodiment 1.

The disk array device 13 adopts a dual controller structure having a controller 20 and a controller 30. The controller 20 in the disk array 13 has a Fibre Channel Protocol controller 131 for front interface connection and a Fibre Channel Protocol controller 132 for back interface connection. The Fibre Channel Protocol controller 131 is interface-connected via the two paths of front interface connection Fibre Channels 43 and 44 to the host computer 70 and has the function of receiving block access requests based on Fibre Channel Protocol. The Fibre Channel Protocol controller 132 is interface-connected via the two paths of back interface connection Fibre Channels 45 and 46 to the disk drives DRV 0 to DRV 14 and has the function of transmitting requests for data input/output to/from the disk drives DRV 0 to DRV 14 based on a protocol regulating commands or the like controlling the disk drives DRV 0 to DRV 14. The back interface connection Fibre Channels 45 and 46 are loop-connected to the disk drives DRV 0 to DRV 14 via FC-ALs 61 and 62 respectively.

Likewise, the controller 30 has: a Fibre Channel Protocol controller 141 interface-connected via the two paths of front interface connection Fibre Channels 53 and 54 to the host computer 70, and a Fibre Channel Protocol controller 142 interface-connected via the two paths of back interface connection Fibre Channels 55 and 56 to the disk drives DRV 0 to DRV 14 for transmitting requests for data input/output to/from the disk drives DRV 0 to DRV 14 based on a protocol regulating commands or the like for controlling the disk drives DRV 0 to DRV 14.

Incidentally, for the ease of explanation, CPUs 21 and 31, local memories 22 and 32, cache memories 24 and 34, and enclosure controllers 28 and 38, each being an constituent element of the disk array device 10 and 13 are omitted in FIG. 11.

In the disk array device 10, when a failure occurs in either the controller 20 or 30, access to the disk drives DRV 0 to DRV 14 has to be made from the other controller having no trouble. Here, with the controllers 20 and 30 individually have only one path of a back interface connection Fibre Channel 42 or 52, it is necessary to conduct path switching at the PBC 27 or the PBC 37 each time access is made to the disk drives DRV 0 to DRV 14, and as a result, access speed is decreased.

On the other hand, in the disk array device 13, the controllers 20 and 30 individually have two paths of back interface connection Fibre Channels—45 and 46, and 55 and 56. Therefore, when a failure occurs in either the controller 20 or 30, access to the disk drives DRV 0 to DRV 14 can be made from the other controller having no trouble via the back interface connection Fibre Channel 45 and 46 or 55 and 56. Therefore, access speed will not decrease.

Accordingly, considering the case where a failure occurs in either the disk array device 10 or 13, it is preferable that high-speed access requested by the host computer 70 or access to frequently-accessed data be mainly made to the disk array device 13 while access where low-speed is sufficient or access to infrequently-accessed data be mainly made to the disk array device 10. Decisions of data storage destinations may be made according to the type of application program operating on the host computer 70 or parameters such as the last data-update date and time.

According to Embodiment 3, the disk array devices 10 and 13 can be used appropriately because where data is stored, that is, either in the disk array device 10 or 13, can be changed according to data access speeds, access frequencies, types of application programs, and parameters such as last update dates and times.

EMBODIMENT 4

Figure 12:
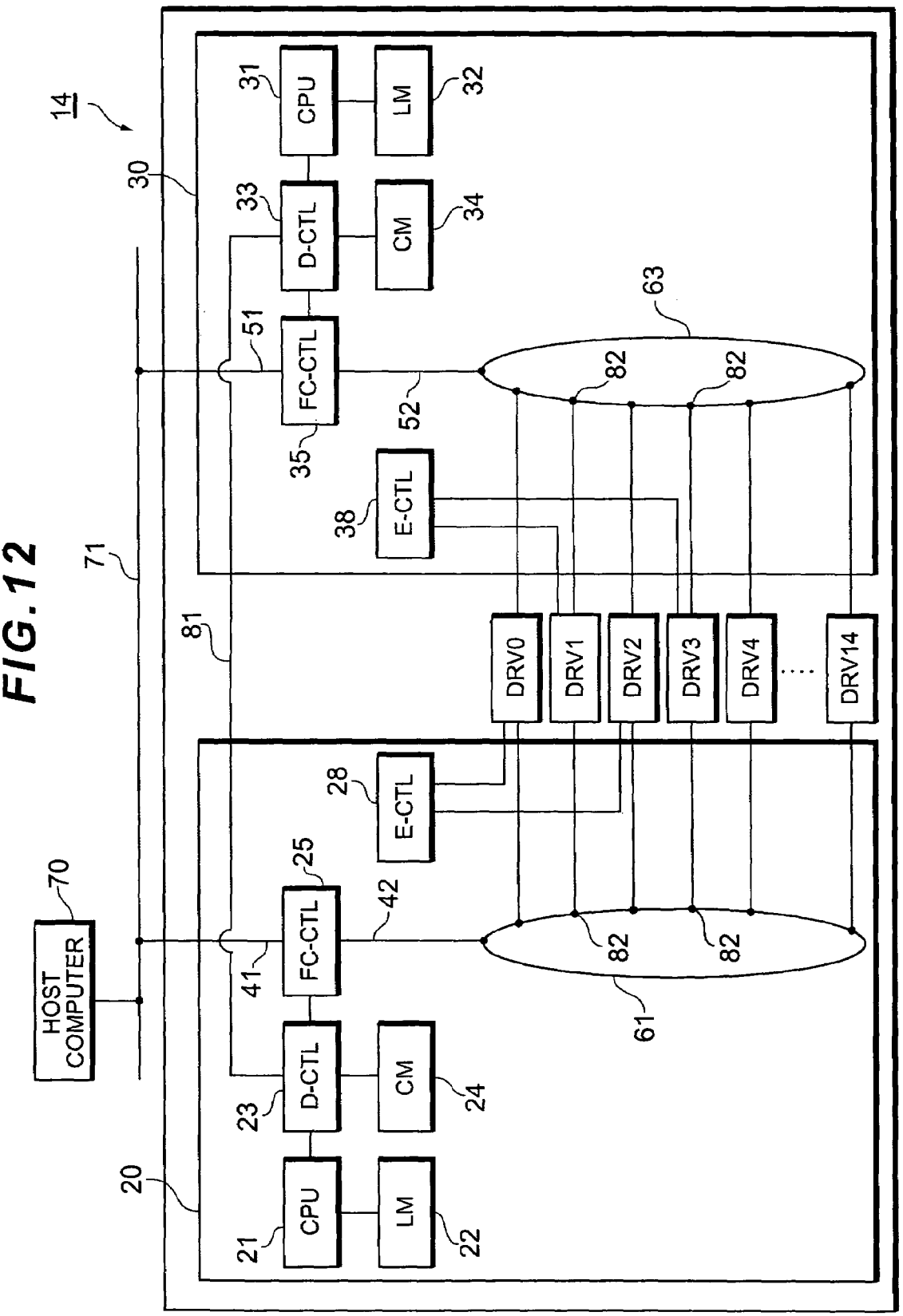
FIG. 12 shows a structure of a disk array device according to Embodiment 4.

FIG. 12 shows a structure of a disk array device 14 according to Embodiment 4. Reference numerals identical to those in FIG. 1 indicate the same elements, accordingly, detailed explanations thereof will be omitted. Controllers 20 and 30 have Fibre Channel Protocol controllers 25 and 35 respectively, to which, front interface connection Fibre Channels 41 and 51 and back interface connection Fibre Channels 42 and 52 are connected respectively, one path for each channel. The controllers 20 and 30 each have a single FC-AL, 61 or 63, which is loop-connected to disk drives DRV 0 to DRV 14. The back interface connection Fibre Channels 42 and 52 are connected to the FC-ALs 61 and 63 respectively.

The controllers 20 and 30 can make write access or read access to all the disk drives DRV 0 to DRV 14 via the FC-AL 61 and 63 respectively. Which controller makes write access or read access to which disk drives among DRV 0 to DRV 14 can be statically or dynamically set. For example, it is possible to fixedly set, in advance, which controller makes write access or read access to which disk drives so that the write access or read access to relevant disk drives can be executed by a relevant controller 20 or 30. Alternatively, which controller is in charge of which disk drives may be determined according to processing loads thereon or access frequency. Connection between the controllers 20 and 30 and the disk drives DRV 0 to DRV 14 are controlled by PBCs 82 on the FC-ALs 61 and 63.

When a failure occurs in one of the ports in any one of the disk drives DRV 0 to DRV 14 connected to the FC-ALs 61 and 63, a loop failure occurs in the relevant FC-AL, 61 or 63, connected to that port. For example, when a failure occurs in one of the disk drive DRV2's ports, the faulty port being connected to the FC-AL 61, packets no longer flow to the FC-AL 61. This kind of loop failure can be solved by the controller 30 transmitting an SES command from the FC-AL 63 via an SES drive to the enclosure controller 28 or 38, controlling a relevant PBC 82, and terminating the connection between the suspicious disk drive and the FC-AL 61.

A loop failure in the FC-AL 61 or 63 may be caused also by an intermittent failure due to breakage or age deterioration thereof, or by an intermittent failure due to a failure in a device (such as a PBC 82) provided therein. When a loop failure due to those reasons occurs, write access or read access to the disk drives DRV 0 to DRV 14 may be made from a FC-AL, 61 or 63, in which no failure has occurred.

According to Embodiment 4, because the system structure can be simplified, the manufacturing cost of the disk array device 14 can be decreased.

EMBODIMENT 5

Figure 13:
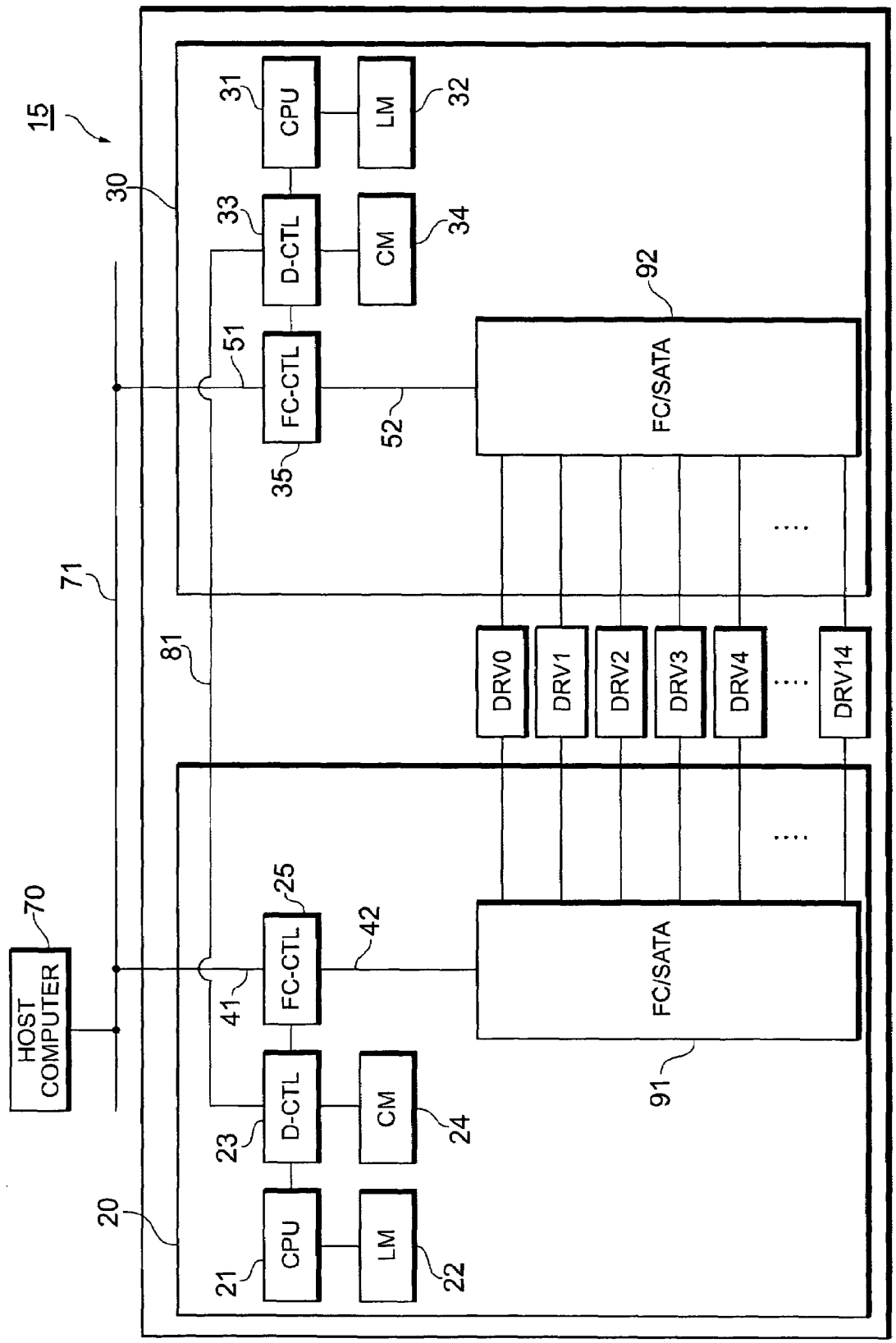
FIG. 13 shows a structure of a disk array device according to Embodiment 5.

FIG. 13 shows a structure of a disk array device 15 according to Embodiment 5. Reference numerals identical to those in FIG. 1 indicate the same elements, accordingly, detailed explanations thereof will be omitted. Fibre Channel Protocol controllers 25 and 35 in controllers 20 and 30 are connected, on one hand, to the host computer 70 via front interface connection Fibre Channels 41 and 51 respectively, and, on the other hand, to disk drives DRV 0 to DRV 14 via back interface connection Fibre Channels 42 and 52, as well as respective FC-SATA conversion interfaces 91 and 92.

According to Embodiment 5, because the controllers 20 and 30 each have one Fibre Channel Protocol controller, 25 and 35, and inexpensive serial ATA disk drives are used as the disk drives DRV 0 to DRV 14, the manufacturing cost of the disk array device can be reduced.

What is claimed is:

1. A disk array device comprising a plurality of controllers for executing data input/output processing for disk drives in response to a data input/output request from a host computer, each of the plurality of controllers comprising:
    a central processing unit (CPU);
    a Fibre Channel Protocol controller having a first core connected to the host computer via a first interface for controlling a first Fibre Channel Protocol for communication between the first interface and the host computer, and a second core connected to the disk drives via a second interface for controlling a second Fibre Channel Protocol for communication between the second interface and the disk drives;
    two FC-ALs loop-connected to the disk drives; and
    a connection switching circuit for switching the FC-ALs to establish a path between one of the FC-ALs and the second interface, wherein, when a failure occurs in one of the plurality of controllers, the CPU of the faulty controller is configured to send a command to the Fibre Channel Protocol controller of the faulty controller to disable an interruption request from the Fibre Channel Protocol controller without initializing said Fibre Channel Protocol controller, to inhibit communication with the host computer while maintaining operation of the first core and the second core.

2. The disk array device according to claim 1, wherein when a loop failure occurs in one of said two FC-ALs therein, said connection switching circuit switches the connection destination of the second interface to the other FC-AL, in which no loop failure has occurred.

3. The disk array device according to claim 1, wherein each of said controllers shares execution of write access or read access to logical volumes set for the plural disk drives.

4. The disk array device according to claim 1, further comprising a plurality of PBCs for connecting each of the plural disk drives to said FC-ALs, wherein when a failure occurs in any one of the plural disk drives, the relevant PBC disconnects the faulty disk drive from said relevant FC-AL.

5. The disk array device according to claim 4, wherein each controller further comprises an enclosure controller for controlling said PBCs, when a failure occurs in any one of the plural disk drives, said controller transmits a command to disconnect the faulty disk drive from said relevant FC-AL to said enclosure controller via said FC-AL in which no loop failure has occurred.

6. The disk array device according to claim 1, wherein said connection switching circuit is a PBC.

7. The disk array device according to claim 1, wherein said connection switching circuit is a switch.

8. The disk array device according to claim 7, wherein said switch is connected to a plurality of Fibre Channels connected to a plurality of kinds of disk drives having different response speeds.

9. The disk array device according to claim 8, wherein a mix of Fibre Channel disk drives and serial ATA disk drives are provided as the disk drives, the disk array device further comprises FC-SATA conversion interfaces for connecting the back interface connection Fibre Channels to the serial ATA disk drives; and in each of the controllers, said switches are connected to said FC-ALs connected to the Fibre Channel disk drives and to said FC-SATA conversion interfaces.

10. The disk array device according to claim 1, wherein in each of said controllers, the number of disk drives that said two FC-Als therein are individually connected to is almost equal.

11. The disk array device according to claim 1, wherein said Fibre Channel Protocol controller is a circuit having, in a single LSI, the first core and the second core.

12. The disk array device according to claim 1, wherein the connection switching circuit of each of the plurality of controllers comprises a first PBC connected to the Fibre Protocol controller via the second interface, a second PBC connected to the first PBC and one of the FC-ALs, and a third PBC connected to the first PBC and the other of the FC-ALs.

13. A storage system comprising a first disk array device, a second disk array device and a host computer which makes a data input/output request to said first and said second disk array devices, wherein said first disk array device comprises a first dual controller for executing data input/output processing for first disk drives in response to a data input/output request from the host computer; each of controllers constituting said first dual controller comprising:
a first central processing unit (CPU);
a first Fibre Channel Protocol controller having a first core connected to the host computer via a first interface for controlling a first Fibre Channel Protocol for communication between the first interface and the host computer, and a second core connected to the first disk drives via a second interface for controlling a second Fibre Channel Protocol for communication between the second interface and the first disk drives;
two first FC-ALs loop-connected to the first disk drives; and
a first connection switching circuit for switching the first FC-ALs to establish a path between one of the first FC-ALs and, the second interface; and
wherein the second disk array device comprises a second dual controller for executing data input/output processing for second disk drives in response to a data input/output request from the host computer;
each of controllers constituting said second dual controller comprising:
a second CPU;
a second Fibre Channel Protocol controller connected to the host computer via two paths of front interface connection Fibre Channels;
a third Fibre Channel Protocol controller connected to the second disk drives via two paths of back interface connection Fibre Channels; and
two second FC-ALs connected to the back interface connection Fibre Channels and loop-connected to the second disk drives,
wherein, when a failure occurs in one of the controllers, the CPU of the faulty controller is configured to send a command to the Fibre Channel Protocol controller of the faulty controller to disable an interruption request from the Fibre Channel Protocol controller of the faulty controller without initializing said Fibre Channel Protocol controller, to inhibit communication with the host computer while maintaining operation of the core interfaces.

14. The storage system according to claim 13, wherein the host computer makes a low-speed access request to the first disk array device and a high-speed access request to the second disk array device.

15. A disk array device comprising a plurality of controllers for executing data input/output processing for disk drives in response to a data input/output request from a host computer, wherein each of the plurality of controllers comprises:
a central processing unit (CPU);
a Fibre Channel Protocol controller having a first core connected to the host computer via a first interface for controlling a first Fibre Channel Protocol for communication between the first interface and the host computer, and a second core connected to the disk drives via a second interface for controlling a second Fibre Channel Protocol for communication between the second interface and the disk drives; and
an FC-SATA conversion interface for connecting the back interface connection Fibre Channel to the disk drives,
wherein, when a failure occurs in one of the plurality of controllers, the CPU of the faulty controller is configured to send a command to the Fibre Channel Protocol controller of the faulty controller to disable an interruption request from the Fibre Channel Protocol controller without initializing said Fibre Channel Protocol controller, to inhibit communication with the host computer while maintaining operation of the first core and the second core.

16. The disk array device according to claim 15, wherein the disk drives are serial ATA disk drives.

17. A method for controlling a disk array device having a dual controller structure, each of controllers constituting said dual controller having a CPU for executing data input/output processing for disk drives in response to a data input/output request from a host computer, a cache memory for temporarily storing data transmitted between the host computer and the disk drives, a Fibre Channel Protocol controller having, in a single LSI circuit, a core interface-connected to the host computer via one path of a front interface connection Fibre Channel for controlling a Fibre Channel Protocol used between itself and the host computer, and a core interface-connected to the disk drives via one path of a back interface connection Fibre Channel for controlling a Fibre Channel Protocol used between itself and the disk drives, a GBIC module transmitting an optical signal with the host computer via the front interface connection Fibre Channel, two FC-ALs loop-connected to the disk drives, and a connection switching circuit for switching a connection destination of the back interface connection Fibre Channel between the two FC-Als,
wherein the CPU execute the steps of: disabling interruption to said CPU from said Fibre Channel Protocol controller without initializing Fibre Channel Protocol controller, in order to maintain operation of the core interfaces;
shutting off negotiations with the host computer being conducted prior to commencement of data communication based on Fibre Channel Protocol;

inhibiting optical signal output from said GBIC module; and saving failure information to said cache memory.

18. The method according to claim 17, wherein when one of said controllers is to be locked out by said method, the other controller inhibits optical signal output from said GBIC module in said controller to be locked out.

19. The method according to claim 17, wherein if one of said controllers cannot be locked out by said method, the other controller inhibits optical signal output from said GBIC module in said controller to be locked out.

* * * * *